United States Patent [19]

Shishkin et al.

[11] Patent Number: 4,891,115

[45] Date of Patent: Jan. 2, 1990

[54] APPARATUS FOR CLEANING THE INNER SURFACE OF A PIPELINE FROM DEPOSITS AND FOR FORMING A PROTECTIVE COATING

[76] Inventors: Viktor V. Shishkin, ulitsa Festivalnava, 1, kv. 5, Krasnodar; Jury D. Samuliev, Petropavlovsk ulitsa Bostandyxkaya, 3, kv. 10, Severo-Kazakhstanskava oblast; Jury P. Shapovalov, ulitsa Alma-Atinskava, 196, Krasnodar; Yaroslav P. Sushkov, ulitsa Kommunisticheskava, 47/1, kv. 73, Eisk; Valery P. Panchenko, ulitsa Kotovskogo, 96, kv. '64, Krasnodar; Evgeny G. Lukin, ulitsa Melnikaite, 18, kv. 2; Alexandr I. Chernyai, I-v mikroraion, 17, kv. 27, both of Alma-Ata; Nikolai F. Kryazhevskikh, ulitsa Krasnvkb partizan, 559, kv. 13, Krasnodar, all of U.S.S.R.

[21] Appl. No.: 878,275

[22] PCT Filed: Oct. 16, 1985

[86] PCT No.: PCT/SU85/00075

§ 371 Date: Jun. 9, 1986

§ 102(e) Date: Jun. 9, 1986

[87] PCT Pub. No.: WO86/02293

PCT Pub. Date: Apr. 24, 1986

[30] Foreign Application Priority Data

| Oct. 17, 1984 | [SU] | U.S.S.R. | 3797502 |
| Oct. 17, 1984 | [SU] | U.S.S.R. | 3797508 |
| Oct. 17, 1984 | [SU] | U.S.S.R. | 3797503 |
| Oct. 17, 1984 | [SU] | U.S.S.R. | 3798007 |
| Oct. 17, 1984 | [SU] | U.S.S.R. | 3797504 |
| Oct. 17, 1984 | [SU] | U.S.S.R. | 3797507 |
| Oct. 17, 1984 | [SU] | U.S.S.R. | 3797501 |
| Oct. 17, 1984 | [SU] | U.S.S.R. | 3797657 |
| Oct. 17, 1984 | [SU] | U.S.S.R. | 3797505 |
| Oct. 17, 1984 | [SU] | U.S.S.R. | 3798008 |

[51] Int. Cl.$^4$ ............ C25D 17/12; B08B 9/04

[52] U.S. Cl. ............ 204/212; 204/224 R; 204/272; 15/104.05; 15/104.063; 15/104.16; 134/166 C

[58] Field of Search ............ 204/212, 224 R, 272; 134/166 R, 166 C; 15/104.06 R, 104.16, 104.05, 104.063

[56] References Cited

U.S. PATENT DOCUMENTS

| 2,106,004 | 1/1938 | Inglee | 15/104.06 R |
| 2,214,982 | 9/1940 | Wylie | 15/104.06 R |

(List continued on next page.)

FOREIGN PATENT DOCUMENTS

| 60593 | of 1985 | Japan . |
| 716647 | of 1980 | U.S.S.R. . |
| 856599 | of 1981 | U.S.S.R. . |
| 956074 | 1/1982 | U.S.S.R. . |

(List continued on next page.)

OTHER PUBLICATIONS

Rosenfeld, "Corrosion Inhibitors," KHIMIA, Moscow, 1977, pp. 50–51 (with translation).

Primary Examiner—Donald R. Valentine
Attorney, Agent, or Firm—Lilling & Greenspan

[57] ABSTRACT

An apparatus is used for both repair of operating pipelines and protection of newly built pipelines and comprises a cleaning tool (1) which is caused to move in the interior of the pipeline (5) under the action of a flow of fluid containing a dissolved inhibitor. The cleaning tool comprises a hub (3) on which blades (4) are secured in two rows to engage the pipeline surface. The blades (4) are displaced with respect to one another so that the angle between two adjacent blades is from 10° to 25° to define apertures along the periphery of the cleaning tool through which jets of fluid can flow to remove a part of deposits and to impregnate the remaining layer with the inhibitor dissolved in the fluid as so to form a protective coating. A support member (11) carrying an impact-type alarm member is mounted on the cleaning tool (1) so as to facilitate location of the apparatus in the pipeline and to maintain the apparatus in a desired position.

22 Claims, 8 Drawing Sheets

U.S. PATENT DOCUMENTS

| | | | |
|---|---|---|---|
| 2,275,190 | 3/1942 | Lowry | 15/104.06 R |
| 2,281,918 | 5/1942 | Constant et al. | 15/104.06 R |
| 2,609,556 | 9/1952 | Carver | 15/104.06 R |
| 3,081,251 | 3/1963 | Spector | 15/104.06 R X |
| 3,130,431 | 4/1964 | Reinhart | 15/104.06 R |
| 3,619,844 | 4/1971 | Collins et al. | 15/104.06 |
| 3,885,521 | 5/1975 | Arx | 15/104.16 X |
| 3,973,056 | 11/1976 | Fessler et al. | 427/136 |
| 4,083,074 | 6/1978 | Curtis | 15/104.06 |
| 4,413,370 | 11/1983 | Payne et al. | 15/104.061 |
| 4,538,316 | 9/1985 | Reinhart et al. | 15/104.061 |

FOREIGN PATENT DOCUMENTS

| | | |
|---|---|---|
| 1037973 | 9/1982 | U.S.S.R. |
| 956075 | 11/1982 | U.S.S.R. |
| 995910 | 7/1983 | U.S.S.R. |
| 1018729 | 12/1983 | U.S.S.R. |

APPARATUS FOR CLEANING THE INNER SURFACE OF A PIPELINE FROM DEPOSITS AND FOR FORMING A PROTECTIVE COATING

BACKGROUND OF THE INVENTION

1. Field of the Invention

The invention relates to operation of main and branch networks of pressure and free-flow metal pipeline, and more particularly, it deals with an apparatus for cleaning the inner surface of pipelines from deposits and for forming a protective coating.

Description of the Prior Art

Known in the art are various methods and apparatuses for cleaning the inner surface of pipelines from deposits. However, while solving the problem of cleaning, they cannot bring a solution to the problem of reliable protection of the pipeline surface against corrosion during cleaning. Thus known in the art is a method for cleaning simultaneously with the protection of the pipeline surface against corrosion, comprising forming a layer of coating on the surface of a pipeline during cleaning by removing deposits and by compacting the remaining layer, all operations being conducted mechanically (cf. USSR Inventor's Certificate No. 1018729, Cl. B 08 B 17/00, publ. May 23, 1983). However the coating thus formed cannot hamper the development of pit corrosion which is detrimental to the pipeline as foci of corrosion remain intact in the compacted layer.

The most widely used the world over is a hydromechanical method for cleaning a pipeline from deposits which comprises causing a self-contained pipe cleaning unit to move along a pipeline under the action of a gauge water pressure, the unit comprising blade-shaped flexible members mounted in a checkerboard fashion, a part of water flowing through the unit to remove deposits separated from the walls by the cutting members of the apparatus (cf. USSR Inventor's Certificate No. 856599, Cl. B 08 B 9/04, publ. Aug. 23, 1981; USSR Inventor's Certificate No. 716647, Cl. B 08 B 9/04, publ. Feb. 25, 1980).

In using this method, the pipeline is cleaned to expose metal, but quality of the surface treatment is inadequate to apply an antitrust coating thereto since a part of corrosion deposits remains in shells and pores of the pipeline surface so as to result in the development of pit corrosion in the pipeline walls later on. In addition, damages to the pipeline surface induced by the apparatus result in that the surface cleaned to expose metal is corroded immediately after the cleaning.

Known in the art is an apparatus for a hydrodynamic cleaning. The apparatus comprises a cleaning tool having a hub carrying spring blades secured thereto to engage the pipeline surface, the blades being arranged in rows and spaced with respect to one another so as to define apertures along their periphery. (cf. USSR Inventor's Certificate No. 995910, Cl. B 08 B 9/04, publ. Feb. 25, 1983). Owing to a structural imperfection of the cleaning tool, a part of energy of the flow of fluid passing through the apertures between the blades is spent to overcome resistances offered by the blades of the apparatus so that fluid jets lack necessary power to wash deposits off the pipeline walls, and a durable protective coating cannot be formed in the pipeline.

SUMMARY OF THE INVENTION

It is an object of the invention to provide an apparatus for cleaning the inner surface of a pipeline and for forming a protective coating, having a cleaning tool thereof which is so constructed as to ensure, by forming fluid jets of a desired power, the removal of the main part of deposite concurrently with washing out of slime products from the remaining layer of deposits and with impregnation of this layer with an inhibitor so as to form a coating, the apparatus enabling cleaning of pipelines of different diameters, including turn portions.

This object is accomplished in an apparatus for cleaning the inner surface of a pipeline from deposits and for forming a protective coating.

A cleaning tool is provided in which apertures are defined between the blades with a maximum angle of 25° ensures the creation of jets of a desired power, the jets effecting a partial destruction of deposits in front of the tool owing to a pressure difference and removing from pores and shells a thin layer of slime corrosion products remaining on the pipeline surface. At the same time, an inhibitor gets into the pores and shells together with the fluid to impregnate the remaining thin layer of deposits and to chemically react with the substances present in the deposit so as to form a protective coating on the pipeline surface. Known inhibitors such as polyphosphates and the like are used for the purpose.

The installation of the blades on the hub at an angle of 40° to 50° makes it possible for the cleaning tool to become smaller (collapse) when the apparatus moves through pipelines having local restrictions or turn portions.

The provision of a support member mounted on the hub makes it possible to improve stability of the apparatus which would not overturn under the action of fluid head.

It is preferred that the blades in each row of the cleaning tool be made integral with the hub, each next row of blades being displaced with respect to the adjacent row in such a manner that passages defined by the apertures should be inclined in one and the same direction whereby the cleaning tool can rotate about the longitudinal axis of the apparatus under the action of jets flowing out of the inclined passages.

According to the invention, each blade of the cleaning tool has a rectangular portion and a trapezoidal portion, the trapezoidal portions of the blades being secured to the hub of the cleaning tool by means of screws with recessed heads, and the blades of the outer row having a central opening for the screw and overlapping by one-half the blades of the inner row that have semicircular recesses in their lateral sides defining with the adjacent blades openings coaxial with the central openings of the blades of the outer row.

This facility enables complete self-disassembly of the cleaning tool in case the apparatus is jammed in the pipeline, owing to deformation of the recessed heads of the screws and separation of the blades from the screws under the action of fluid head increasing in the pipeline upstream the apparatus.

The ends of the blades engaging the pipeline surface may extend substantially at right angles to the surface being treated so as to result in a substantial change in the velocity of fluid flow caused by individual jets merging into an annular flow leading to hydraulic hammers a head of the cleaning tool thus contributing to improved quality of cleaning.

In accordance with one embodiment of the cleaning tool, a cylindrical rod made of a mixture of water-soluble substances and an inhibitor is mounted on the support member. This facility makes it possible to maintain a desired concentration of inhibitor in the fluid during gradual dissolution of the cylinder so as to form a protective coating on the pipeline surface concurrently with its cleaning from deposits. Widely known chemically active substances can be used as inhibitors.

In accordance with other embodiment of the cleaning tool, the end of the support member engaging the pipeline surface carries an impact-type alarm member in the form of a roller having a projection or, alternatively, the support member is made in the form of a lever having a rotatable flap at one end thereof received in the hub of the cleaning tool and a counterweight at the other end engaging the pipeline surface upon rotation of the flap so as to function as an impact-type alarm member or, alternatively, the support member is made in the form of a rotatable arm having a counterweight and mounted on the hub of the cleaning tool by means of a pipe which is mounted for rotation and has a turbine, the blades of the turbine engaging the support member during rotation of the turbine under the action of the flow.

All these embodiments of the support member make it possible to substantially simplify design of the alarm members and allow the location of the apparatus moving through the pipeline to be determined very rapidly.

The cleaning tool may be provided with a means for forcing fluid containing an inhibitor into the deposit layer, said means comprising a source of electric current a discharge device, and electrodes connected to a discharge device, the hub of the cleaning tool incorporating a pipe accommodating the source of electric current and a chamber housing the electrodes protruding into the interior of the pipeline as well as the discharge device. The means for forcing the inhibitor creates hydraulic hammers so as to form in the pores of the remaining layer of deposits products of hydraulysis of the inhibitor. A shock wave having its front directed towards the pipeline walls, which forms after the discharge between the electrodes, will reliably force the inhibitor dissolved in water deep into the deposits which are compared so as to form a compact coating. At the same time, permittivity of the deposits for products of reaction of a polyphosphate with other elements is enhanced.

The cleaning tool may having a source of electric current having the anode which is connected to plates secured to the blades of the inner row and the cathode connected to the blades of the outer row. This facility ensures the creation of a movable electric field between the pipeline wall and the apparatus, the field moving synchronously with the movement of the cleaning and impragnation zone. In this case, the electric field is created behind the cleaning front.

In accordance with another embodiment of the apparatus, the cleaning tool is provided with a second hub, the ends of the blades of the first hub being secured to the second hub so as to define a space for receiving an inhibitor, communicating with the interior of the pipeline through the apertures between the blades, the central portions of the blades extending in parallel with the pipeline surface being cleansed and functioning as a support member of the cleaning tool. This design of the cleaning tool makes it possible to combine functions of the cleaning member, receptacle and mixer for inhibitor, a means for supplying the inhibitor into the deposit, and a support member.

In this embodiment of the cleaning tool, one of the hubs preferably carries a sleeve having radial ports adjacent to the bottom wall thereof, the sleeve having its bottom wall received in the interior space of the cleaning tool and having a turbine, the turbine blades being disposed above the radial ports of the sleeve so that the turbine can be used as an impact-type alarm member facilitating location of the apparatus in the pipeline.

An electric generator and plates made of an electrochemically soluble alloy may be accommodated in the interior of the cleaning tool, the plates being mounted on the blades of the inner row with the interposition of insulating gaskets, the field of the electric generator being secured to the turbine and the winding being mounted on the sleeve and connected, via a d-c converter, to the plates and blades.

BRIEF DESCRIPTION OF THE DRAWING

The invention will now be described with reference to a detailed disclosure of embodiments of an apparatus for cleaning the inner surface of pipelines from deposits and for forming a protective coating shown in the accompanying drawings, in which.

DESCRIPTION OF THE PREFERRED EMBODIMENTS

Figure 1:
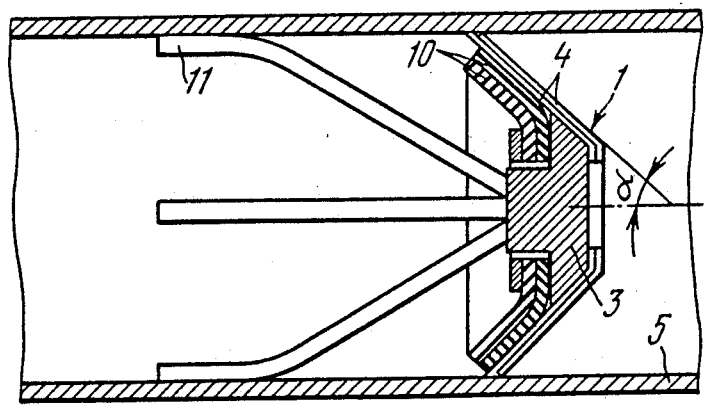
FIG. 1 is a longitudinal sectional view of an apparatus for cleaning the inner surface of pipelines from deposits and for forming a protective coating, according to the invention.

An apparatus for cleaning the inner surface of a pipeline from deposits is placed into the pipeline and is caused to move therealong by a flow of fluid containing an inhibitor. The fluid comprises an aqueous solution of an inhibitor such as odium polysulphate so that the apparatus, concurrently with the cleaning of the inner surface, applies a protective coating thereto.

The apparatus comprises one cleaning tool 1 (FIG. 1) if it is used for cleaning pipeline having turns at over 120°, or two cleaning tools 1 (FIG. 2) interconnected by a pipe 2 if it is used for cleaning pipelines with turns less than at 120°.

Each cleaning tool 1 comprises a hub 3 carrying spring plates 4 secured thereto, the free ends of the blades being engageable with the inner surface of the pipeline 5. The spring blades 4 are made of thin metal sheets exhibiting resilience of a spring. The blades 4 are secured to the hub 3 in two or more rows, and the blades in each row are displaced with respect to one another, e.g. in the checkerboard fashion so as to define apertures 6 (FIGS. 3) along the periphery of the cleaning tool, the apertures being defined between the ends of the blades 4 and the inner surface of the pipeline 5. The blades 4 (FIGS. 1, 2) are secured to the hub 3 at an angle $\alpha = 40$–$50°$ with respect to the longitudinal axis of the cleaning too. Thus, if the angle $\alpha$ at which the blades are installed in smaller than 40°, the length of the blades is greater and the force of friction at the inner surface of the pipeline is lower. If the angle $\alpha$ is greater than 50°, the rigidity of the blades increases so as to impart impact loads to the apparatus thus loading to non-uniform removal of deposits from the walls of the pipeline.

An angle $\beta$ between every two adjacent blades 4 along the periphery of the cleaning tool is 10° to 25° so as to create fluid jets passing through the apertures 6 and having a necessary power to remove the major part of deposits so as to leave on the surface of the pipeline a layer of solid fractions of the deposits. If the angle $\beta$ is smaller than 10°, the fluid jets will overlap one another. Turbulent vortices will be formed at the points of overlap which are vigorous enough to completely break the layer of depositive on the pipeline surface so as not to allow the desired result to be achieved. If the angle between the blades is greater than 25°, the expansion of the jets will result in a decrease in the fluid head so that it will prove inadequate for removing the deposits.

The blades 4 of each row in the cleaning tool 1 (FIG. 4) may be made integral with the hub. In the assembled cleaning tool 1, the hubs are placed tightly against each other and are tied-up by any tie-up member 7. Each next row of blades is displaced with respect to the adjacent row of blades, and passages 8 defined by the apertures 6 are inclined in one and the same direction so as to create a rotating reactive torque of the jets causing rotation of the apparatus during its movement through the pipeline. As a result, a layer of deposits of uniform thickness is left on the pipeline surface. A thrust sleeve 9 is mounted between the cleaning tools 1 of the apparatus.

Collars 10 of a flexible material such as rubber are provided on the hub 3 under the blades 4 (FIGS. 1, 2) to cover the apertures 6 between the blades in the zone adjacent to the hub so as to ensure overflow of fluid through the apertures at the periphery of the cleaning tool and to contribute to the movement of the apparatus along the pipeline under the action of fluid flow.

In the apparatus having one cleaning tool (FIG. 1), there are provided one or several, e.g. three support members 11, each being secured to the hub 3 and having its free end engaging the inner surface of the pipeline 5 so as to maintain the apparatus in a pre-set position during cleaning of the pipeline.

Figure 5:
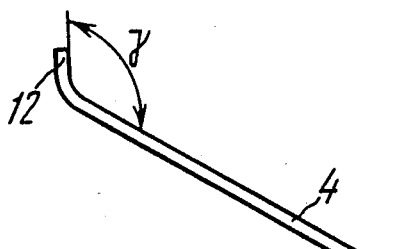
FIG. 5 is an embodiment of a blade of a cleaning tool.

The ends 12 (FIG. 2) of the blades 4 engaging the surface of the pipeline extend substantially at right angles to the surface being treated. This is achieved by the fact that the end 12 of each blade 4 is bent with respect to the remaining part of the blade 4 (FIG. 5) at an angle $\gamma = 135$–$160°$ thereto. If this angle is smaller than 135°, the ends of the blades would give rise to a resistance to the movement of the apparatus by bearing against the layer of deposits, and with an angle greater than 160° the ends of the blades would slide over the deposits without removing them as desired.

Figure 6:
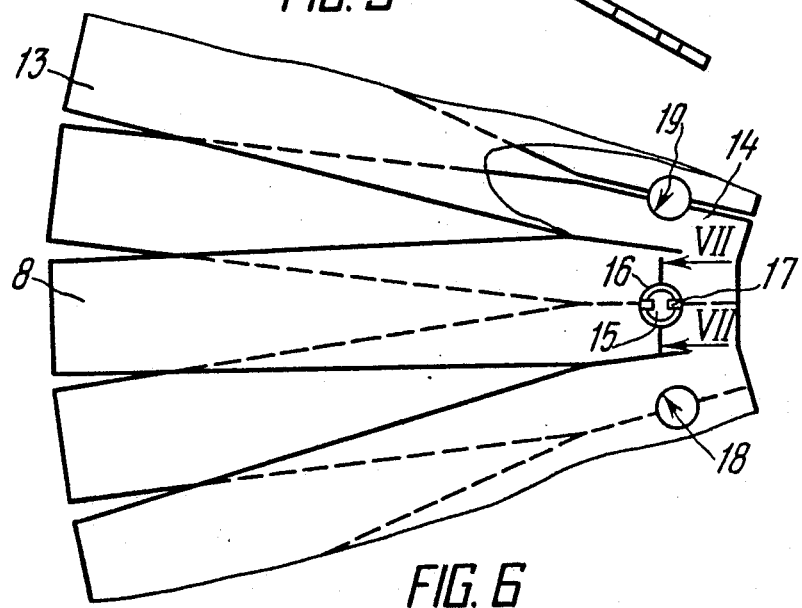
FIG. 6 is an embodiment showing fastening of blades to the hub of the cleaning tool of FIG. 1.
Figure 7:
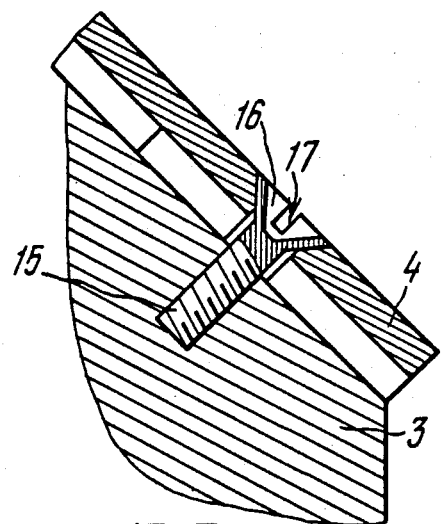
FIG. 7 is a sectional view taken along the line VII—VII in FIG. 6.

Each blade 4 has a rectangular portion 13 (FIG. 6) and a trapezoidal portion 14. The portions 14 of the blades are secured to the hub 3 by screws 15 having recessed heads 16 (FIG. 7) with a central groove 17. The blades 4 of the outer row overlap the blades of the inner row by one-half as shown in FIG. 6 and have a central openings 18 for the screws 15. Semicircular recesses 19 are made in the lateral sides of the blades of the inner row. The semicircular recesses 19 of the adjacent blades define openings coaxial with the central openings 18 of the blades of the outer row so that a single screw 15 can be used for fastening the blades of the two rows. If pressure in the pipeline rises abruptly above the design pressure value, the recessed head 16 is deformed (collapses) owing to the provision of the groove 17, and the blades of both rows are readily removed by the fluid flow over the head of the screw. As a result, the cleaning tool breaks to components (blades and hub).

Figure 8:
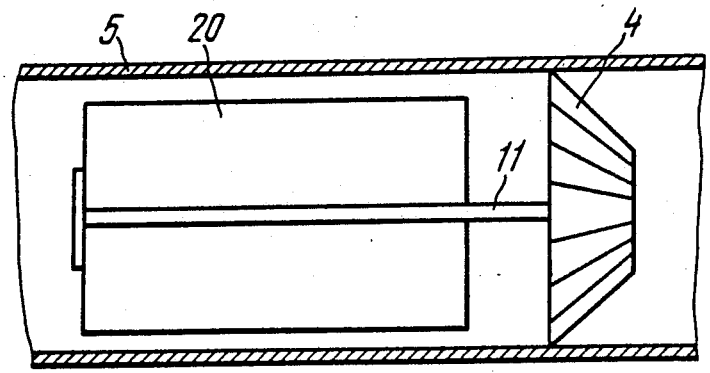
FIG. 8 shows an apparatus with a support member having a cylindrical rod made of a mixture of water-soluble substances and an inhibitor.

The cleaning tool 1 shown in FIG. 8 has a single support member 11 installed coaxially with the tool axis aligned with the axis of the pipeline 5. A cylindrical member 20 made of a mixture of water-soluble substances such as dry ice (solid carbon dioxide) and an inhibitor is secured to the support member 11 so that a pre-set concentration of inhibitor can be maintained in the flow of fluid owing to a gradual dissolution of the cylinder 20.

The apparatus according to the invention functions in the following manner.

The pipeline 5 is opened, and the apparatus according to the invention is placed into the pipeline. After the pipeline wall has been sealed at the point of introduction of the apparatus, a known per se system is used for pumping into the pipeline a fluid (working agent such as water) containing a dissolved inhibitor or activator so as to move the apparatus along the pipeline. The fluid passes through the apertures 6 defined between the inner surface of the pipeline 5 and the ends of the blades 4 of the cleaning tool 1 that let through 30–50% of the fluid supplied to the pipeline. Fluid jets shead of the cleaning tool acquire a dynamic head so as to effect partial breakage and removal of deposits from the inner surface of the pipeline 5. When the jet impinges upon the deposit, it is split into two parts.

One part of the jet moving through pores, shells and pits formed during corrosion of the pipeline gets into a space between the wall of the pipeline 5 and the deposit and is decelerated.

The other part of the jet passes at a higher velocity through an annular space defined between the blades 4 of the cleaning tool 1 (FIG. 1) and the deposit. Under the action of these parts of jets, a pressure difference of the order of from 0.2 to 1.25 MPa arises in the deposit to break it up. Thus, a porous layer of solid fractions of the deposit which has a strong adhesion to the wall of the pipeline 5 is left on the wall of the pipeline 5.

Since the excrescences are porous in structure, their pores are filled with the fluid. As any fluid contains a gas, an abrupt pressure reduction over the deposit surface will result in its breaking up to fine particles because of the gas expansion. In addition, a supercavernous space is formed ahead of the apparatus, in the central zone of the pipeline, owing to the jet action, and deposits getting into this space are comminuted and removed by the fluid flow from the pipeline in the form of suspension.

During operation of the cleaning tool, porous excrescences are broken-up from within owing to a gas and vapour cavitation caused by an abrupt pressure reduction within the excrescence during the flow of fluid jet escaping from the annular aperture of the cleaning tool around the excrescence surface.

A desired pressure difference in the deposit layer is created by controlling in a known per se manner fluid pressure upstream the cleaning apparatus in the fluid supply system and also by a braking force acting on the apparatus by virtue of its design according to the invention and by providing a certain fluid flow through the cleaning tool.

As soon as the cleaned portion of the pipeline surface is left behind the annular space owing to the movement of the apparatus, the fluid containing the dissolved inhibitor is forced into its pores under the action of high pressure upstream the cleaning tool.

The inhibitor will chemically react with components of the deposits, products of corrosion of the pipeline, or components f a product normally conveyed through the pipeline during its operation so as to form difficultly soluble compounds which tightly seal-off the pores in the remaining layer of deposits thus forming a protective coating on the inner surface of the pipeline. The removal of a part of deposits and impregnation of the remaining layer with an inhibitor are facilitated by hydraulic hammers or hydrospark shock waves created during cleaning owing either to the design of the blades shown in FIG. 5 or to the embodiment of the cleaning tool as shown in FIGS. 1, 2.

Upon an increase in pressure within the pipeline upstream the cleaning tool, the outer row of the blades 4 will be bent to a greater extent as compared to the blades of the inner row so that the apertures 6 are enlarged to offer a greater throughput capacity for fluid flow with a simultaneous increase in its velocity. When pre-set pressure and flow rate of fluid are achieved, the velocity of movement of the cleaning apparatus increases, and pressure downstream the apparatus decreases. The blades return to their initial position, the apertures 6 are narrowed, and a hydraulic hammer occurs in the fluid flow upstream the cleaning tool, which acts upon the cleaning tool so as to accelerate it. This process is continually repeated.

Figure 2:
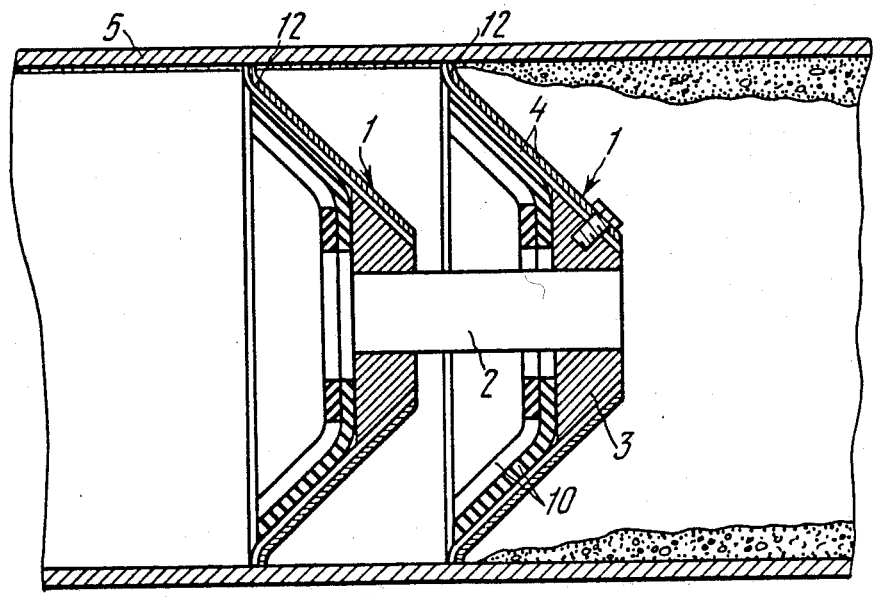
FIG. 2 shows an apparatus according to the invention, having two cleaning tools, without a support member.
Figure 3:
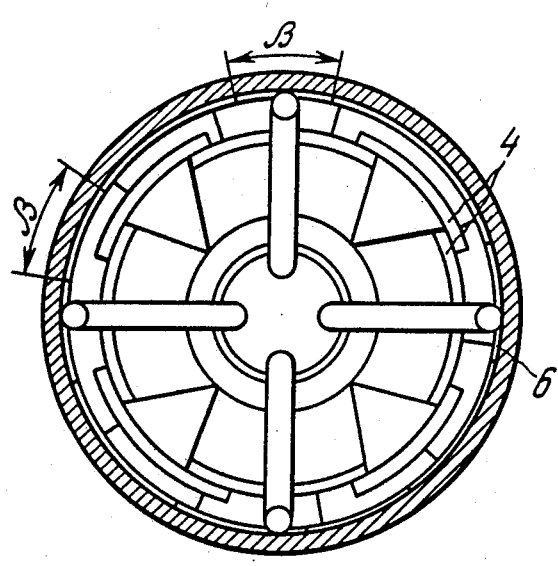
FIG. 3 is a rear elevation of the apparatus shown in FIG. 1.
Figure 4:
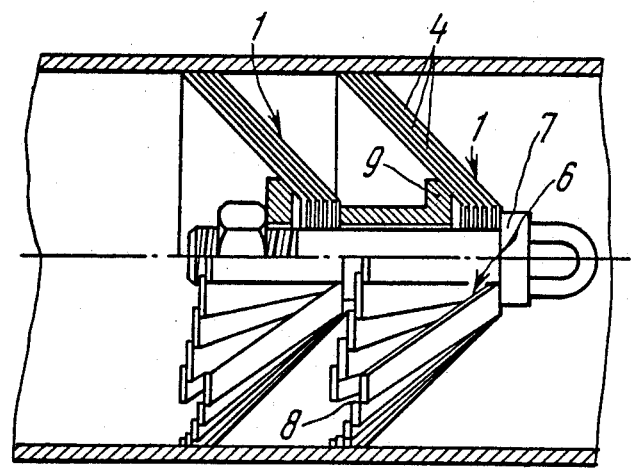
FIG. 4 shows an apparatus of FIG. 2, in which each cleaning tool has blades made integral with the hub.

The pre-set position of the apparatus, as well as its rotation during movement through the pipeline, are maintained owing to the structural features of the cleaning tool shown in FIGS. 1, 2, 4.

The support member of the cleaning tool may be made with various design features. Thus FIG. 1 shows the support members 11 made of elastic steel rods.

Figure 9:
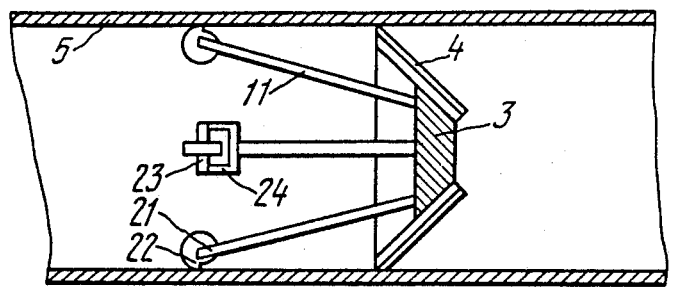
FIG. 9 shows an apparatus in which the support member has an impact-type alarm member.

FIG. 9 shows the support members 11 made of elastic rods having impact-type alarm members provided at the ends of the rods and engaging the surface of the pipeline 5. Each alarm member comprises a roller 21 having a projection 22. During movement of the apparatus through the pipeline, the rollers 21 run over the surface of the pipeline, and their projections strike at the pipeline so that the apparatus may easily be located within the pipeline. In addition, the frequency of blows may be an indicator of the speed at which the apparatus moves. Each roller 21 is mounted on a pivot pin 23. The pivot pin 23 is journalled in a bracket 24 rigidly secured to the end of the support member 11.

Figure 10:
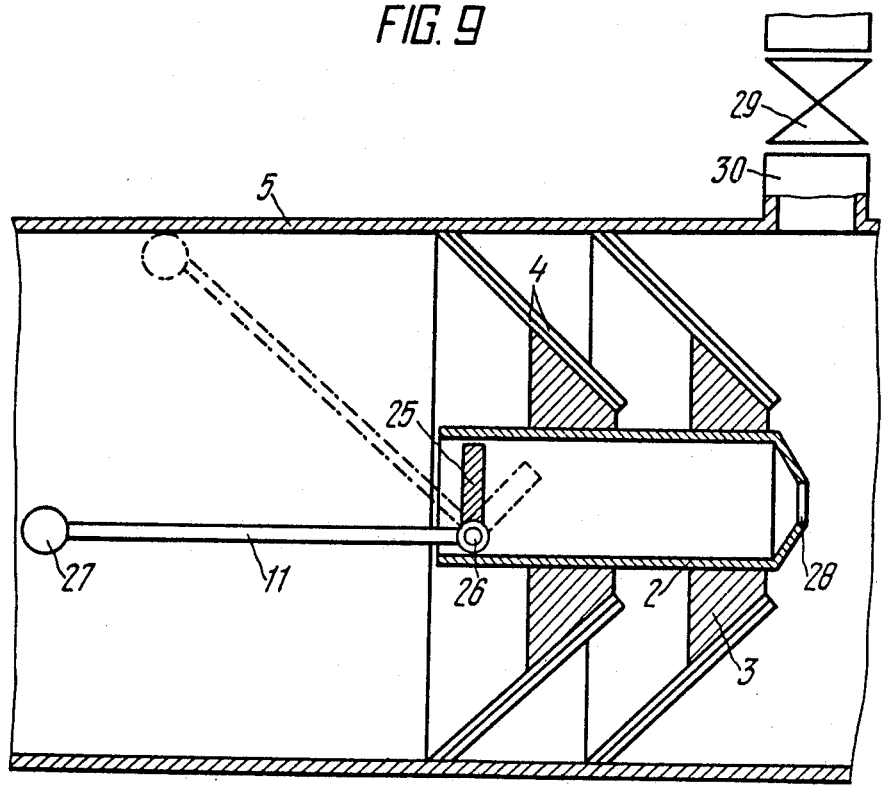
FIG. 10 shows the apparatus for FIG. 2 with a different embodiment of the alarm member.

FIG. 10 shows the support member 11 having a rotatable flap 25 accommodated in the pipe 2 of the cleaning tool on a rotatable pivot pin 26. A counterweight 27 is secured to the opposite end of the support member 11 to strike at the surface of the pipeline 5 upon rotation of the flap 25 so as to function as an alarm member. The pipe 2 has at the forward end thereof a nozzle 28 forming a fluid jet contributing to comminution and washing out of deposits ahead of the cleaning apparatus and also to the creation of a reduced pressure in the central zone of the pipeline thus enhancing intensity of separation of deposits form the pipeline surface.

The flap 25 is caused to rotate under the action of a pressure increase in the pipeline upstream the apparatus. In the initial position, the flap 25 is in the upright position so as to shut off the interior of the pipe 2. Should the cleaning tool be braked owing to the presence of large excrescences on the pipeline surface, pressure upstream the apparatus will rise, and the force acting upon the cleaning tool will increase. With a certain pressure increase, the flap is caused to rotate so as to open the interior space of the pipe 2. The counterweight will strike a the pipeline 5, and the fluid will flow through the nozzle 28 so that fluid flow rate and velocity will increase. Pressure of the fluid in the pipeline will decrease, and the flap will return to the initial position so as to shut-off the interior of the pipe 2. A hydraulic hammer thus occurs so that the apparatus will rapidly advance through the pipeline 5. The cycle is then repeated.

Regular rotations of the flap will contribute to cyclic pressure changes in the central zone of the pipeline, hence within the deposits.

Impacts of the counterweight at the pipeline 5 may occur both during movement of the apparatus and when the apparatus is stationary by opening and closing a gate 29 of a pipe 30 for discharging slime which is installed on the pipeline 5.

Figure 11:
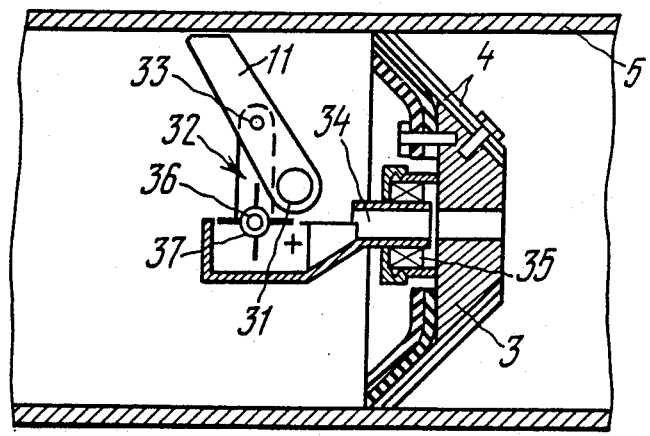
FIG. 11 is still another embodiment of the alarm member.

FIG. 11 shows the support member 11 in the form of a rotatable arm having a counterweight 31. The arm is mounted on a support 32 by means of a pivot pin 33. The support 32 is secured to the hub 3 of the cleaning tool by means of a pipe 34. The pipe 34 is journalled on the hub 3 by means of bearings 35 so that the pipe 34 can rotate, the center of gravity of the pipe 34 being offset with respect to its longitudinal axis so that the pipe 34, support 32 and support member 11 are held in a pre-set position, i.e. upright. As a result, the support member 11 permanently engages the pipeline surface with any position of the cleaning tool.

Mounted in the pipe 34 by means of a shaft 36 is a turbine 27 having blades which, during rotation of the turbine 37 under the action of fluid flow through the pipe 34, engage the support member 11 to displace if from the pre-set position. As a result, the support member 11 will strike at the surface of the pipeline 5.

Figure 12:
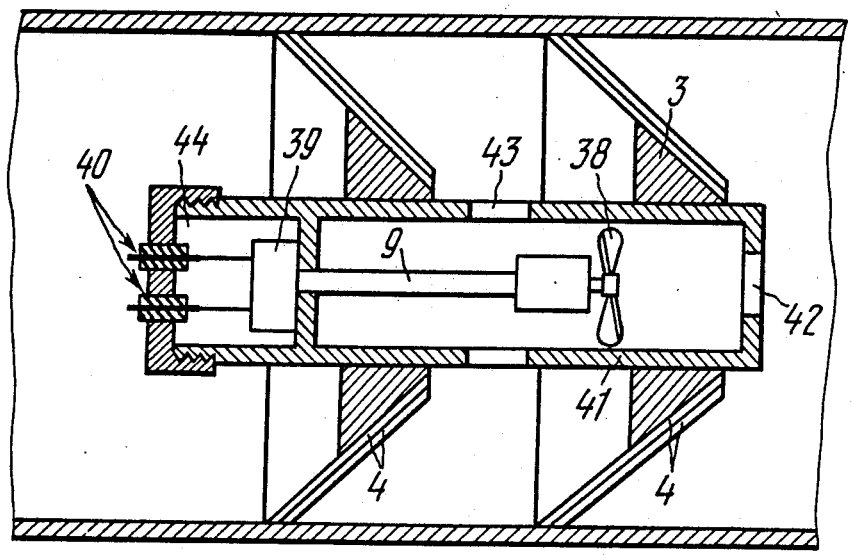
FIG. 12 shows an apparatus having a means for forcing an inhibitor into the layer of deposits.

FIG. 12 shows the cleaning tool having a means for forcing the inhibitor into the layer of deposits, said means comprising a source of electric current 38 (a generator), a discharge device 39 (a capacitor), and electrodes 40. The hub 3 of the cleaning tool 1 incorporates a pipe 41 in which is accommodated the source of electric current 38. A nozzle 42 is provided in the forward end of the pipe 41, and an opening 43 is provided in the intermediate part of the pipe to let fluid through the interior of the pipe 41 and nozzle 42 so as to rotate a generator turbine. A chamber 44 is provided in the rearward part of the pipe 41 to accommodate the discharge device 39 and the electrodes 40, the electrodes 40 being connected to the discharge device 39 and mounted in such a manner as to partly protrude into the interior of the pipeline 5. During rotation of the generator, an electric charge is accumulated in the discharge device 39 and, when a pre-set potential is achieved at the electrodes, an electric discharge occurs to initiate a hydrospark effect. The shock wave front will force the inhibitor into the layer of deposits left on the surface of the pipeline and will add to the force causing the apparatus to move through the pipeline.

Figure 13:
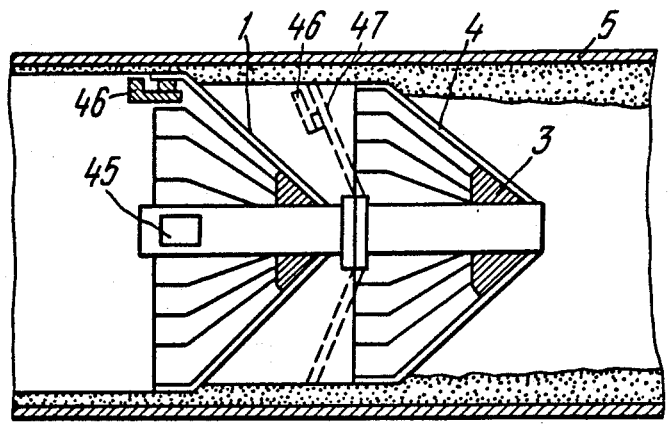
FIG. 13 shows an apparatus having a means for creating an electric field.

In order to a form a strong coating during cleaning of the pipeline, the apparatus is provided with a means for creating an electric field in the zone of formation of the coating. For that purpose, the cleaning tool may be provided with any appropriate known source of electric current 45 (FIG. 13) such as a generator or storage battery. The anode of the source 45 is connected to plates 46 secured to the blades 48 of the inner row through the interposition of electrically insulating gaskets, or to auxiliary blades 47 shown with dotted lines. The plates 46 may be made of an electrically soluble alloy of any appropriate known composition. The cathode of the source 45 is connected to the blades 4 of the outer row.

Figure 14:
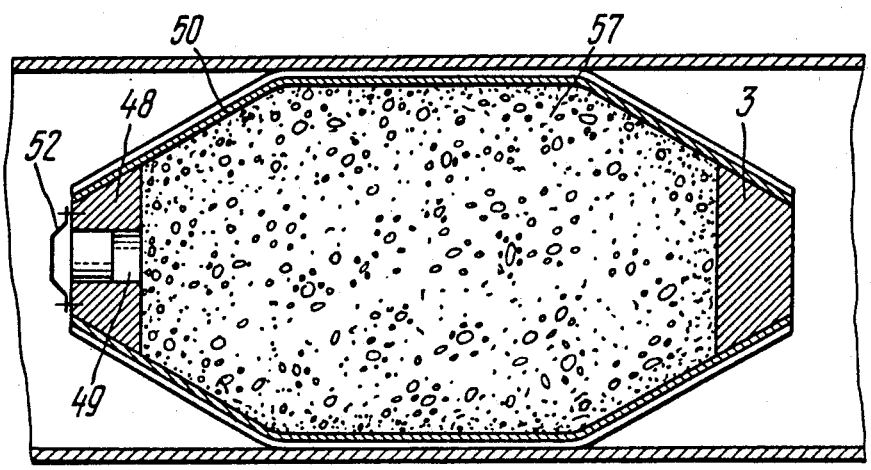
FIG. 14 shows an apparatus in which the cleaning tool has two hubs and a space defined by the tool blades.

FIG. 14 shows the cleaning tool having a second hub 48 with a central opening 49. Blades 50 of the cleaning tool have their ends secured to the hubs 3 and 48 so as to define a space 51 in which an inhibitor is placed in the form of a powder, granules or gel. The space 51 communicates with the interior of the pipeline through the apertures between the blades 50. The central portions of eh blades 50 extend in parallel with the pipeline surface being cleaned and function as a support member for the cleaning tool. The opening 49 of the hub 48 is shut-off by a plug 52. This embodiment of the apparatus makes it possible to maintain a desired concentration of inhibitor in the coating zone through gradual dissolution of the inhibitor.

Figure 15:
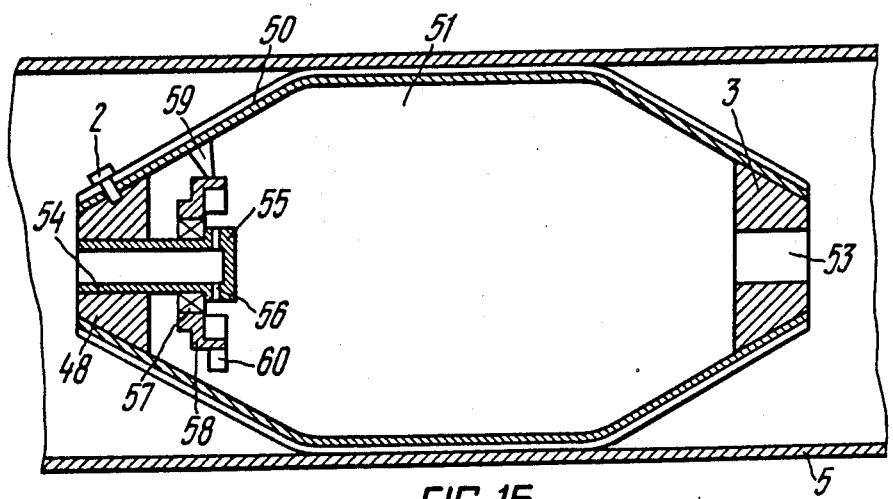
FIG. 15 is ditto of FIG. 14, with an alarm member provided in the space.

FIG. 15 shows the cleaning tool similar to that shown in FIG. 14. The only difference is that the hub 3 has an opening 53, and a sleeve 54 is installed in the opening 49 of the hub 48 and has its bottom wall 55 protruding into the space 51. Radial ports 56 are made in the sleeve 54 adjacent to its bottom wall 55. Mounted on the sleeve 54 by means of bearings 57 is a turbine 58 having its blades disposed above the ports 56 of the sleeve.

An elastic projection 59 cooperating with a projection 60 of the turbine body is provided in the zone of the turbine 58, on one of the blades 50 of the inner row.

With this embodiment of the cleaning tool, the apparatus functions in the following manner.

Water is pumped into the pipeline upstream the cleaning apparatus. A part of the flow passes through the apertures defined between the blades 50 and the pipeline wall. Water is accelerated within these apertures to form jets which, owing to dynamic head and cavitation, remove a part of the deposite layer from the surface of the pipeline 5.

A part of the water passes through the pores 56 of the sleeve 54 to rotate the turbine 58 which, upon every revolution, engages the projection 59 so as to transmit an impact through the blade 50 to the wall of the pipeline 5.

The noise occurring upon impacts of the turbine 58 against the projection 59 is an indicator of location of the apparatus in the pipeline.

If the cleaning apparatus is decelerated in its movement through the pipeline, e.g. in case thickness of deposits increases or in case a large quantity of deposits has accumulated in front of the cleaning device, pressure in the pipeline upstream the cleaning apparatus increases. The blades 50 of the cleaning apparatus will be pressed tightly against the wall of the pipeline under the action of the axial force acting upon the apparatus so as to narrow the apertures. The jet velocity materially increases so as to remove the thick layer of deposits from the walls of the pipeline. If the layer of deposits is no removed from the walls of eh pipeline at a certain pressure, pressure in the pipeline will continue to rise.

Under the action of the rising pressure, the blades 50 will be bent to enlarge the apertures, and water will flow through them at a higher velocity. Pressure upstream the apparatus will abruptly decrease. The blades 50 will return to the initial position so as to instantaneously reduce the cross-sectional area of the apertures. As a result, a hydraulic hammer occurs which causes the blades to open. Thus oscillations of the blades will occur and, owing to hydraulic hammers, pressure and velocity of the jets will increase manifold at the moments of hydraulic hammer.

The jet pressure will act upon deposits. Since the deposits are porous, and their pores are filled with water and dissolved gases, a pressure increase in the jets will cause a pressure rise within the body of deposits. Upon an abrupt pressure decrease in the jet, pressure around the deposit will drop. The gases available within the body of deposits will instantly expand so as to break-up the deposits from within.

This process improves efficiency of cleaning.

Owing to elasticity of the blades 4 (FIGS. 1–13) and 50 (FIGS. 14, 15), the apparatus can be used in pipelines of a varying cross-section. The elastic force of the blades 4 and 50 will always tightly press them against the pipeline wall. When the apparatus enters a local restriction, the pipe body will squeeze the blades 4 and 50 of the cleaning apparatus. The blades are straightened, and the cleaning tool expands axially so as to pass easily through the restricted portion of the pipeline or through a turn.

Figure 16:
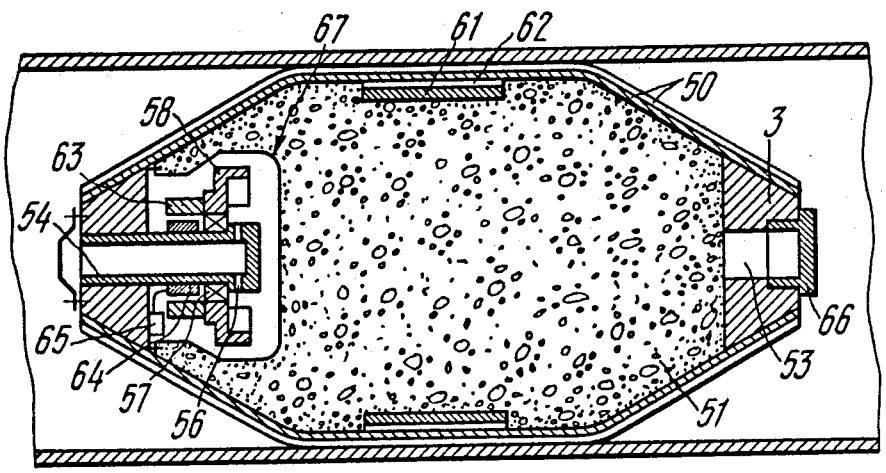
FIG. 16 is ditto of FIG. 14, with a means for creating an electric field provided in the space.

FIG. 16 shows a cleaning tool similar to that shown in FIG. 15. The only difference is in that it is provided with plates 61 made of an electrochemically soluble alloy of an appropriate known composition accommodated in the space 51 and mounted through the interposition of insulating gaskets 62 secured to the blades 50 of the inner row so as to create an electric field in the cleaning and coating zone.

A known electric generator is mounted on the turbine 58 and has a field (made up of permanent magnets) and an electric winding 64 mounted on the sleeve 54. The ends of the winding 64 are connected, via a d.c. converter, to the blades 50 and plates 61. The opening 53 of the hub 3 is shut-off by a plug 66. The sleeve and the turbine are enclosed in a net casing 67.

This apparatus functions in a manner similar to the apparatus shown in FIG. 15. However, owing to its structural distinctions, a part of the fluid flow is admitted through the ports 56 (FIG. 16) of the cleaning apparatus to the turbine 57 which rotates to generate electric current which is fed to the blades 50 and plates 61 made of an electrochemically soluble alloy. The fluid escapes from the space 51 of the cleaning tool through the apertures between the blades 50. The plates 61 are dissolved to be deposited on the pipeline wall so as to form a protective coating.

Before starting the apparatus, a solid inhibitor is charged into the space 51 through the opening 53. When fluid flows through the space containing the inhibitor, the latter is dissolved and reacts with the elements of the soluble plate 61, elements of deposits and material (iron) of the pipeline so as to form difficulty soluble compounds deposited on the wall of the pipeline.

Apparatus for cleaning the inner surface of a pipeline from deposits and for forming a protective coating may be used in various branches of the economy, e.g. in irrigation, municipal and potable water supply as well as in the heat supply and in supplying water to oil and gas wells.

The invention may be used for both repair of operating pipelines and protection of newly built pipelines.

We claim:

1. An apparatus for cleaning the inner surface of a pipeline from deposits and for forming a protective coating, comprising a cleaning tool (1) which is caused to move in the interior of eh pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°–25° C., the cleaning tool (1) having a support member (11) engaging the inner surface of the pipeline, each blade having a rectangular portion (13) and a trapezoidal portion 14, the trapezoidal portions (14) of the blades being secured to the hub (3) of the cleaning tool (1) by means of screw (15) with hollow head (16), and the blades (4) of the outer row having central opening (18) for the screw (15) and overlapping the blades of the inner row by one half- and semicircular recesses (19) are made in the lateral sides of the blades of the inner row so as to define with the adjacent blades openings coaxial with the central openings of the blades of the outer row.

2. An apparatus according to claim 1, characterized in that the ends of the blades engaging the surface of the pipeline extend substantially at right angles to the surfaces being treated.

3. An apparatus according to claim 2, characterized in that the cleaning tool is provided with a source of electric current having the anode of said source being connected to plates secured to the blades of the inner row and the cathode of said source being connected to the blades of the outer row.

4. An apparatus according to claim 1, characterized in that the cleaning tool is provided with a means for forcing fluid containing an inhibitor into the deposit layer, said means comprising a source of electric current, a discharge device, and electrodes connected to the discharge device the hub of the cleaning tool incorporating a pipe accommodating the source of electric current and a chamber accommodating the electrodes protruding into the interior of the pipeline and the discharge device.

5. An apparatus according to claim 1, characterized in that the cleaning tool is provided with a source of electric current having the anode of said source being connected to plates secured to the blades of the inner row and the cathode of said source being connected to the blades of the outer row.

6. An apparatus for cleaning the inner surface of a pipeline from deposits and for forming a protective coating, comprising a cleaning tool (1) which is caused to move in the interior of the pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°–25   C., the cleaning tool (1) having a support member (11) engaging the inner surface of the pipeline; and a cylindrical rod (20) made of a mixture of water-soluble substances and an inhibitor is mounted on the support member (11).

7. An apparatus according to claim 6, characterized in that an impact-type alarm member in the form of a roller having a projection is mounted on the end of the support member engaging the surface of the pipeline.

8. An apparatus according to claim 7, characterized in that the cleaning tool is provided with a source of electric current having the anode of said source being connected to plates secured to the blades of the inner row and the cathode of said source being connected to the blades of the outer row.

9. An apparatus according to claim 6, characterized in that the cleaning tool is provided with a source of electric current having the anode of said source being connected to plates secured to the blades of the inner row and the cathode of said source being connected to the blades of the outer row.

10. An apparatus for cleaning the inner surface of a pipeline from deposits and from forming a protective coating, comprising a cleaning tool (1) which is caused to move in the interior of the pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°–25   C., the cleaning tool (1) having a support member (11) engaging the inner surface of the pipeline; an impact-type alarm member in the form of a roller (21) having a projection (22) mounted on the end of the support member engaging the surface of the pipeline.

11. An apparatus according to claim 10, characterized in that the cleaning tool is provided with a source of electric current having the anode of said source being connected to plates secured to the blades of the inner row and the cathode of said source being connected to the blades of the outer row.

12. An apparatus for cleaning the inner surface of a pipeline from deposits and for forming a protective coating, comprising a cleaning tool (1) which is caused to move in the interior of the pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°-25° C., the cleaning tool (1) having a support member (11) engaging the inner surface of the pipeline, wherein the support member (11) is made in the form of a lever having at one end thereof a rotatable flap (25) accommodated in the hub of the cleaning tool and a counterweight (27) engaging the pipeline surface at the other and which is engageable with the pipeline surface upon rotation of the flap (25) so as to function as an impact-type alarm member.

13. An apparatus according to claim 12, characterized in that the cleaning tool is provided with a source of electric current having the anode of said source being connected to plates secured to the blades of the inner row and the cathode of said source being connected to the blades of the outer row.

14. An apparatus for cleaning the inner surface of a pipeline from deposits and for forming a protective coating, comprising a cleaning tool (10) which is caused to move in the interior of the pipeline by a flow of fluid containing an inhibitor and which comprises spring blades (4) engaging the pipeline surface (5) and mounted on a hub (3) in at least one inner and outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°-25° C., the cleaning tool (1) having a support member (11) engaging the inner surface of the pipeline, wherein the support member (11) comprises a rotatable arm having a counterweight (31) and mounted on the hub (3) of the cleaning tool (1) by means of a pipe (34) mounted for rotation and having a turbine, (37) the blades of the turbine engaging the support member (11) during rotation of the turbine under the action of fluid flow.

15. An apparatus according to claim 14, characterized in that the cleaning tool is provided with a source of electric current having the anode of said source being connected to plates secured to the blades of the inner row and the cathode of said source being connected to the blades of the outer row.

16. An apparatus for cleaning the inner surface of a pipeline from deposits and for forming a protective coating, comprising a cleaning tool (1) which is caused to move in the interior of the pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°-25° C., the cleaning tool (1) having a support member (11) engaging the inner surface of the pipeline, wherein the cleaning tool (1) is provided with a source of electric current (45) having the anode of said source being connected to plates (46) secured to the blades of the inner row and the cathode of said source being connected to the blades (4) of the outer row.

17. An apparatus for cleaning the inner surface of a pipeline from deposits and for forming a protective coating, comprising a cleaning tool (1) which is caused to move in the interior of the pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°-25° C., the cleaning tool (1) having a support member (11) engaging the inner surface of the pipeline, wherein the cleaning tool (1) is provided with a second hub (48) to which are secured the ends of the blades (50) of the first hub (3) so as to define a space (51) for accommodating an inhibitor, communicating with the interior of the pipeline through the apertures between the blades (50), the central portions of the blades extending in parallel with the surface of the pipeline being cleaned and functioning as the support member of the cleaning tool.

18. An apparatus according to claim 17, characterized in that a sleeve (54) having radial ports (56) adjacent to the bottom wall (55) thereof is mounted on one of the hubs, the sleeve (54) being provided with a turbine (58) having blades disposed above the radial ports (56) of the sleeve (54).

19. An apparatus according to claim 18, characterized in that the interior space of the cleaning tool accommodates an electric generator and plates of an electrochemically soluble alloy, the plates being mounted, through the interposition of insulating gaskets on the blades of the inner row, the field of the electric generator being secured to the turbine and the winding being mounted on the sleeve and being connected, via a d.c. converter mounted on the hub, to the blades and plates.

20. An apparatus according to claim 17, characterized in that the interior space (51) of the cleaning tool accommodates an electric generator and plates (61) of an electrochemically soluble alloy, the plates being mounted, through the interposition of insulating gaskets (62), on the blades (50) of the inner row, the field of the electric generator (63) being secured to the turbine (58) and the winding (64) being mounted on the sleeve (54) and being connected, via a d.c. converter (65) mounted on the hub, to the blades (50) and plates (61).

21. An apparatus for cleaning the inner surface of a pipeline from deposits and for forming a protective coating, comprising a cleaning tool (1) which is caused to move in the interior of the pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°–25° C., the cleaning tool (1) having a support member (11) engaging the inner surface of the pipeline, wherein the blades (4) of each row are made integral with the hub, and each next row of the blades of the cleaning tool is displaced with respect to the adjacent row in such a manner that passages defined by the apertures are inclined in one and the same direction, and wherein the cleaning tool is provided with a source of electric current having the anode of said source being connected to plates secured to the blades of the inner row and cathode of said source being connected to the blades of the outer row.

22. An apparatus for cleaning the inner surface of a pipeline from deposits and for forming a protective coating, comprising a cleaning tool (1) which is caused to move in the interior of the pipeline by a flow of fluid containing an inhibitor and which comprises spring blades (4) engaging the pipeline surface (5) and mounted on a hub (3) in at least one inner and one outer row, the blades in the rows being spaced with respect to one another so as to define apertures along the periphery of the cleaning tool (1), characterized according to the invention in that, the blades (4) of the cleaning tool (1) are mounted at an angle of 40° to 50° with respect to the longitudinal axis of the tool, and the angle between every two adjacent blades being 10°–25° C., the cleaning tool (1) having a support member (11) engaging the inner surface of the pipeline, wherein the blades (4) of each row are made integral with the hub, and each next row of the blades of the cleaning tool is displaced with respect to the adjacent row in such a manner that passages defined by the apertures are inclined in one and the same direction, and wherein the ends of the blades engaging the surface of the pipeline extend substantially at right angles to the surfaces being treated, and the cleaning tool is provided with a source of electric current having the anode of said source being connected to plates secured to the blades of the inner row and the cathode of said source being connected to the blades of the outer row.

* * * * *